Figure 2A:
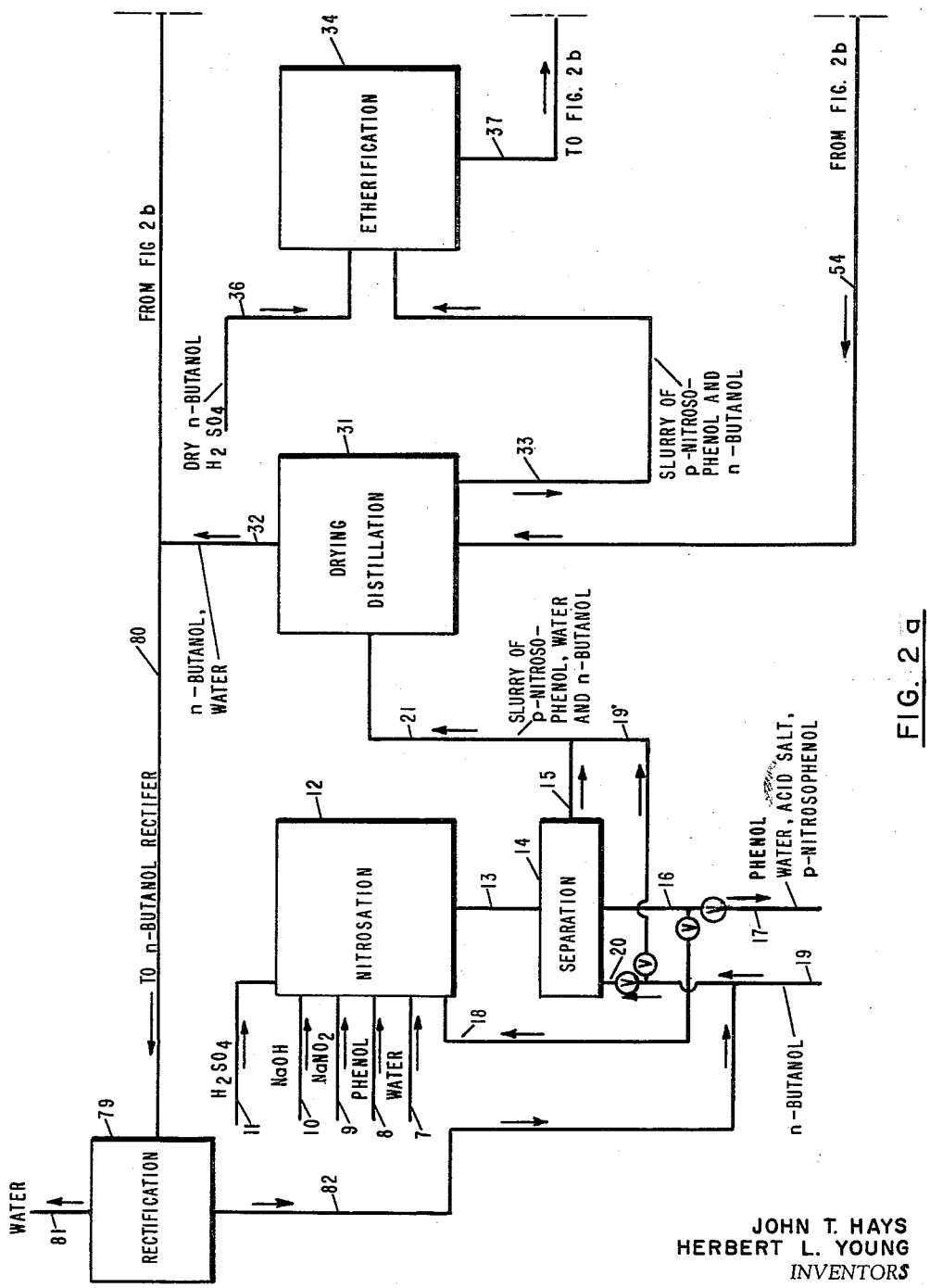

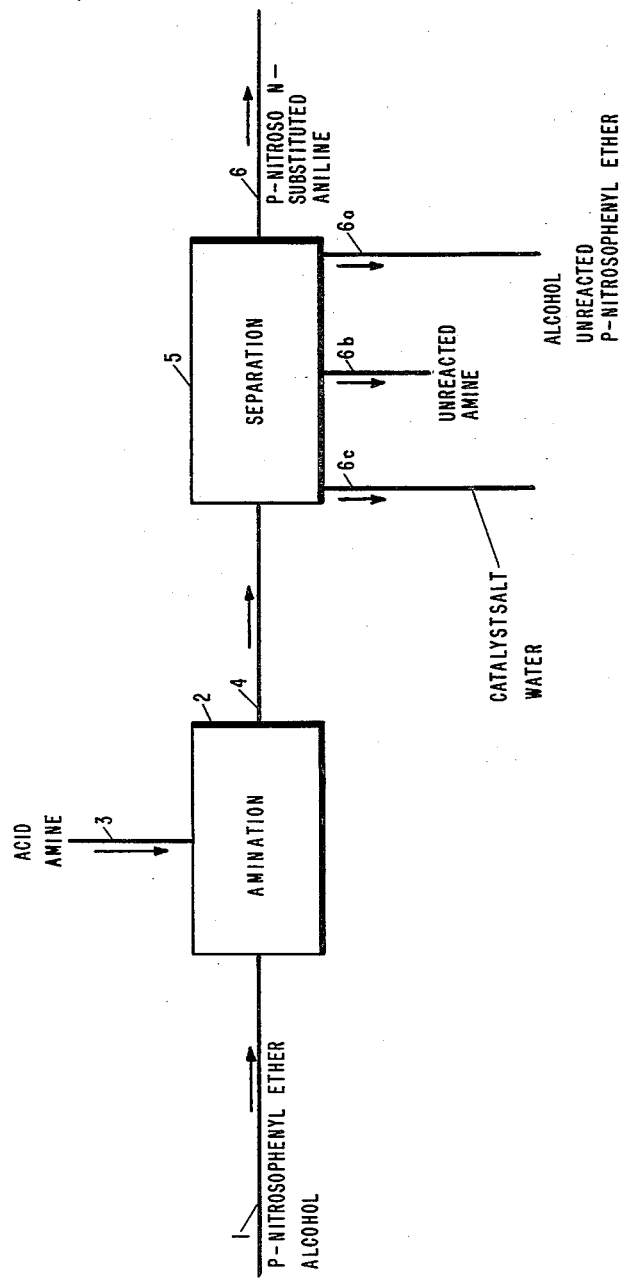
FIG. I
JOHN T. HAYS
HERBERT L. YOUNG
INVENTORS
BY Ernest G. Peterson
AGENT

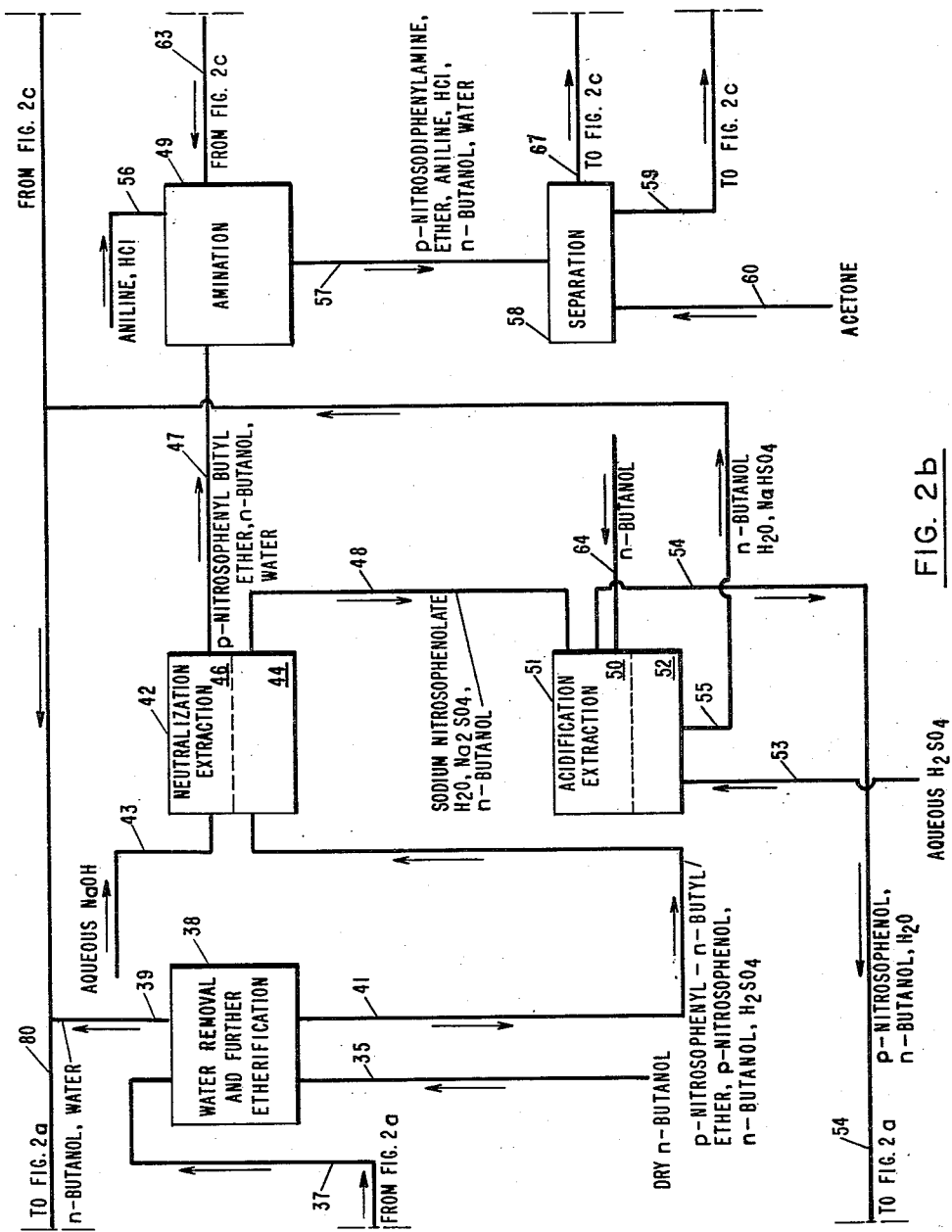

JOHN T. HAYS
HERBERT L. YOUNG
INVENTORS

BY Ernest G. Peterson
AGENT

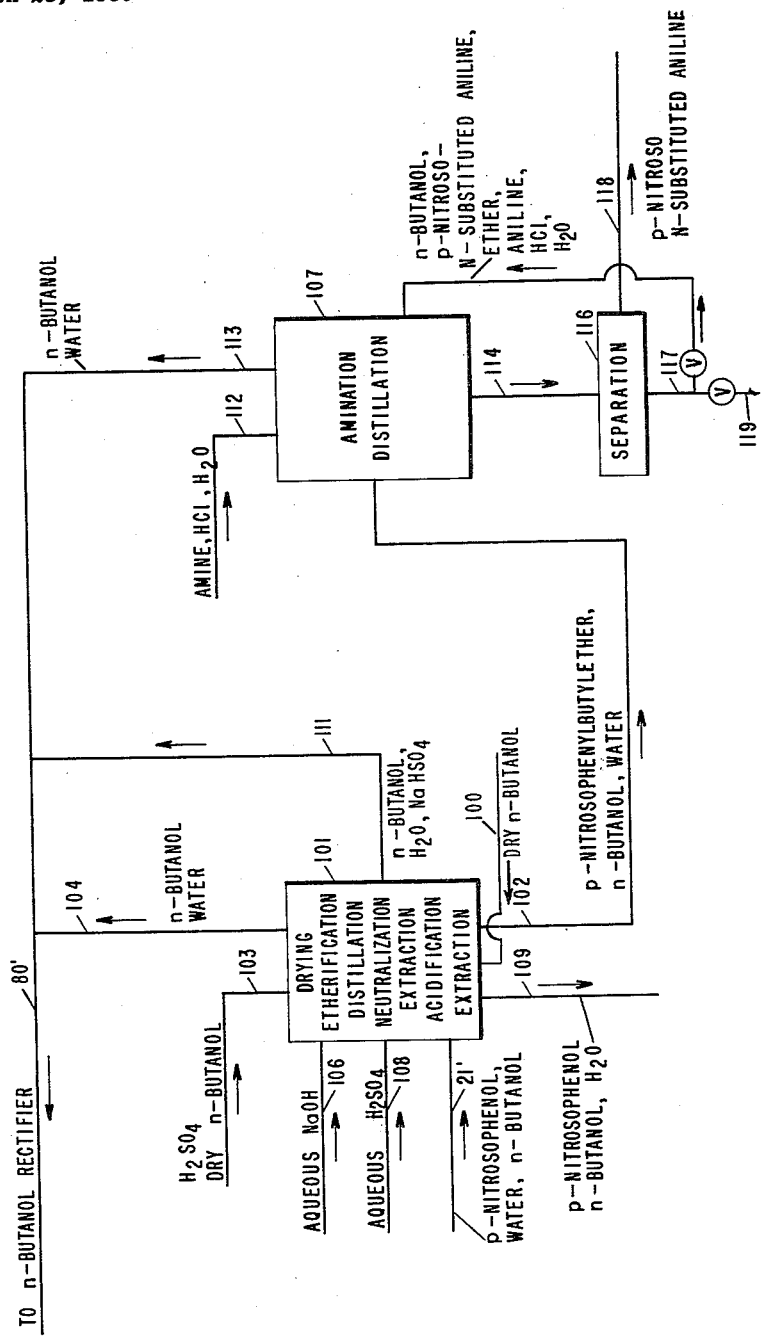

Oct. 15, 1963   J. T. HAYS ET AL   3,107,264
PROCESS FOR PRODUCTION OF P-NITROSO-N-SUBSTITUTED ANILINES
Filed March 28, 1960   9 Sheets-Sheet 6

JOHN T. HAYS
HERBERT L. YOUNG
INVENTORS

BY Ernest G. Peterson

AGENT

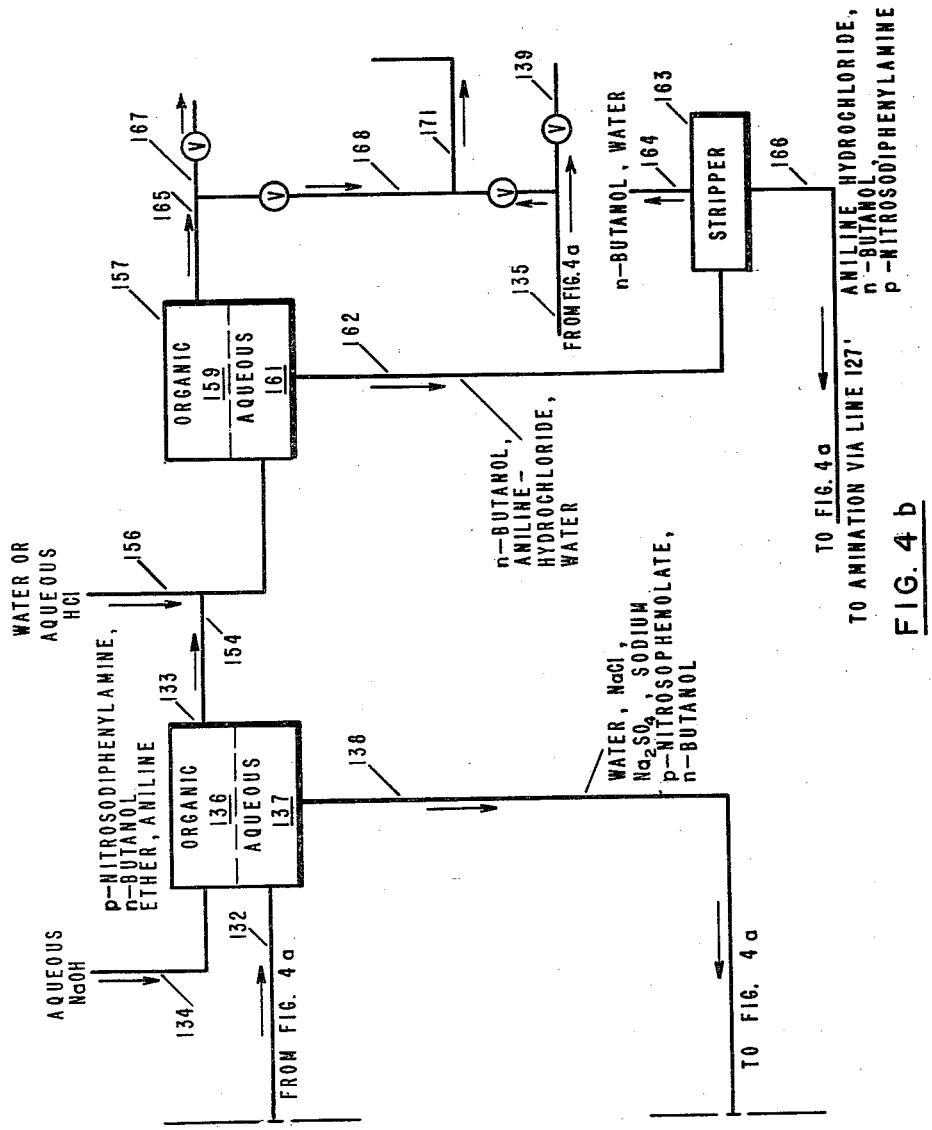

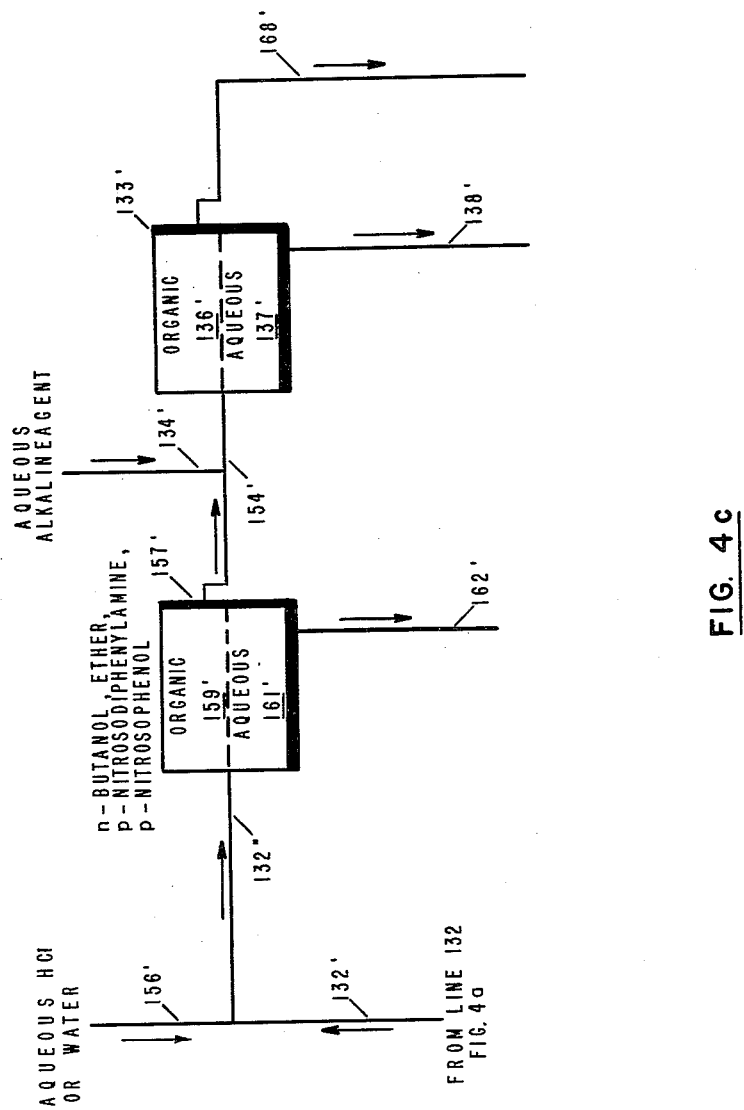

Oct. 15, 1963 J. T. HAYS ET AL 3,107,264
PROCESS FOR PRODUCTION OF P-NITROSO-N-SUBSTITUTED ANILINES
Filed March 28, 1960 9 Sheets-Sheet 9

JOHN T. HAYS
HERBERT L. YOUNG
INVENTORS

BY Ernest G. Peterson
AGENT

United States Patent Office 3,107,264
Patented Oct. 15, 1963

3,107,264
PROCESS FOR PRODUCTION OF P-NITROSO-N-SUBSTITUTED ANILINES
John T. Hays, New Castle, and Herbert L. Young, Wilmington, Del., assignors to Hercules Powder Company, Wilmington, Del., a corporation of Delaware
Filed Mar. 28, 1960, Ser. No. 17,894
9 Claims. (Cl. 260—576)

This invention relates to the manufacture of p-nitroso-N-substituted anilines. In one aspect this invention relates to the preparation of p-nitroso-N-substituted anilines by the amination of p-nitrosophenyl ethers employing primary phenyl and primary aliphatic amines as amination agents. In another aspect this invention relates to a process for the manufacture of p-nitroso-N-substituted anilines from phenol, the said process comprising a combination of steps of phenol nitrosation, etherification of p-nitrosophenol so produced to form the corresponding p-nitrosophenyl ether, and amination of the p-nitrosophenyl ether so produced to form the corresponding p-nitroso-N-substituted aniline. In still another aspect this invention relates to the manufacture of p-nitrosodiphenylamine (p-nitroso-N-phenyl aniline) by amination of a p-nitrosophenyl ether employing aniline as the amination agent and, when desired, to the reductive alkylation of the p-nitrosodiphenylamine so produced to form N-isopropyl-N'-phenyl-p-phenylenediamine which is characterized by especial antiozonant and antioxidant properties. In still another aspect this invention relates to the manufacture of p-nitroso-N-methyl aniline, which is an important intermediate in the production of vulcanization agents for certain rubbers, by amination of a p-nitrosophenyl ether with monomethyl amine. Other aspects will be apparent from the accompanying disclosure and the claims.

p-Nitroso-N-substituted anilines have especial utility as chemical intermediates, particularly in respect to the ease in which the nitroso group can be reduced to provide corresponding amine derivatives. A preferred method for preparation of these compounds, it appears, would be to directly aminate p-nitrosophenol, and thereby provide a direct route from phenol as a starting material. However, we have found that when carrying out such a proposed reaction, only a slight conversion to p-nitroso-N-substituted aniline is obtained, say, from about 3 to 5 percent, which is insufficient from the standpoint of economical commercial scale operation.

This invention is based on our discovery that p-nitrosophenyl ethers can be directly aminated to form the corresponding p-nitroso-N-substituted anilines, to provide an amination route from phenol to the p-nitroso-N-substituted aniline. Our invention is, therefore, based on a novel amination reaction, and provides method for carrying out the amination, the said method being particularly advantageously applied in combination with nitrosation and etherification steps described hereinafter to provide for the manufacture of p-nitroso-N-substituted anilines utilizing phenol, or p-nitrosophenol, as a starting reactant. Method for carrying out the said etherification is disclosed and claimed in the copending applications Serial Nos. 17,893, 17,895, and 17,896, each filed March 28, 1960.

In accordance with the invention a method is provided for the manufacture of p-nitroso-N-substituted anilines which comprises reacting a p-nitrosophenyl ether with a primary amine selected from the group consisting of phenyl and aliphatic amines at a temperature within the range of from 0 to 160° C. in the presence of an acid as a catalyst to form the said p-nitroso-N-substituted aniline. Further in accordance with the invention, a method for the manufacture of p-nitroso-N-substituted anilines is provided which comprises the steps of reacting p-nitrosophenol with a primary or secondary alcohol in the presence of an acid under conditions for forming the corresponding p-nitrosophenyl ether, and reacting the ether so produced with a primary phenyl or aliphatic amine in the presence of an acid to form the corresponding p-nitroso-N-substituted aniline, whereby p-nitrosophenol which is directly aminated to form the p-nitroso-N-substituted aniline in only small yield, if at all, is indirectly aminated to form the said p-nitroso-N-substituted aniline in high yield. Further in accordance with the invention, p-nitrosophenol is etherified in the presence of an acid, employing a primary or secondary alcohol as the etherifying reactant to form the corresponding p-nitrosophenyl ether, followed by amination of the ether so produced, employing aniline as the amination agent, to form p-nitrosodiphenylamine followed by the reductive alkylation of the p-nitrosodiphenylamine to produce N-isopropyl-N'-phenyl-p-phenylenediamine which exhibits especial antiozonant and antioxidant properties.

Any primary aliphatic or phenyl amine can be utilized as the aminating agent, the choice of which is generally determined by the ultimate product sought. Aniline is a now preferred aminating reactant not only because of its reactivity and stability under the amination conditions, but also because it leads to the formation of diphenyl amine derivatives which have numerous applications well known to the art. Exemplary amine reactants are: ethylamine, isopropylamine, isobutylamine, allylamine, laurylamine, beta-phenylethylamine, tetrahydroabietylamine, dehydroabietylamine, hexamethylenediamine, p-aminodiphenylamine, and 2-amino-2-methyl-1-propanol. Additional illustrative amine reactants are set forth in Table I hereinafter.

Preferred among the primary amine reactants in the practice of this invention are those represented by the structural formula

$$RNH_2$$

wherein R is a radical selected from the group consisting of alkyl, alkenyl, phenyl, halophenyl, aminophenyl, phenylalkyl, abietylalkyl, cycloaliphatic, hydroxyalkyl, alkylphenyl, alkoxyphenyl, aminoalkyl, cyanophenyl, nitrophenyl, carboxyphenyl, aminotolylphenyl, hydroxyphenyl, aminobiphenyl and phenylaminophenyl, but said amine containing not more than 30 carbon atoms in the molecule.

Any p-nitrosophenyl ether can be utilized as an ether reactant in the practice of the invention, the said reactant preferably containing not more than 36 carbon atoms. Exemplary ether reactants are those formed by reaction of p-nitrosophenol with an alcohol in the etherification of the above said copending application Serial No. 17,895 and correspond to those alcohol reactants exemplified therein, namely, p-nitrosophenyl octacosanol ether, ethylene glycol mono-p-nitrosophenyl ether, glycerol mono-p-nitrosophenyl ether, pentaerythritol mono-p-nitrosophenyl ether, hexamethylene glycol mono-p-nitrosophenyl ether, p-nitrosophenyl hexoxybenzyl ether, p-nitrosophenyl n- propyl ether, p-nitrosophenyl i-butyl ether, p-nitrosophenyl n-decyl ether, p-nitrosophenyl lauryl ether, p-nitrosophenyl stearyl ether, p-nitrosophenyl ceryl ether, p-nitrosophenyl cinnamic ether, p-nitrosophenyl tetrahydrofurfuryl ether, p-nitrosophenyl furfuryl ether, p-nitrosophenyl p-octyl-benzyl ether, p-nitrosophenyl p-methylbenzyl ether, p-nitrosophenyl p-chlorobenzyl ether, p-nitrosophenyl propargyl ether, p-nitrosophenyl isopropylpropargyl ether, p-nitrosophenyl 2-phenyl ethyl ether, p-nitrosophenyl methyl ether, p-nitrosophenyl cetyl ether, p-nitrosophenyl benzyl ether, p-nitrosophenyl allyl ether, p-nitrosophenyl oleyl ether, p-nitrosophenyl isopropyl ether, p-nitrosophenyl isoamyl ether, p-nitrosophenyl 2-octyl ether, and p-nitrosophenyl cyclohexyl ether.

Now preferred ether reactants employed in the practice of the invention are those characterized by the structural formula

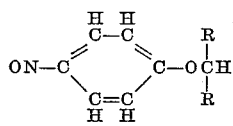

wherein each R is selected from the group consisting of hydrogen, alkyl, alkenyl, alkinyl, phenyl, alkylphenyl, phenylalkyl, alkoxyphenyl, phenylalkenyl, alkoxy alkyl, hydroxy alkyl, cycloaliphatic, halophenyl, nitrophenyl, furan and tetrahydrofuran, but the above said

containing no more than 30 carbon atoms, the said ether thereby containing no more than 36 carbon atoms.

Preferred temperatures employed in the p-nitrosophenyl ether-primary amine reaction, also referred to herein as the amination, are generally within the range of about 15 to 100° C., more often within the range of about 25 to 75° C. Temperatures somewhat above 160° C. can be employed when desired although at such levels undesirable side reactions take place due in part, at least, to decomposition of either or both of the ether reactant and amination product with concomitantly low yield. At temperatures below 0° C., some amination occurs, but the rate of reaction is generally too low to be of any commercial significance, i.e., from the standpoint of economics.

Reaction time utilized in carrying out the amination is generally within the range of about 1 minute to 48 hours, the reaction time being correlated inversely with the temperature, and the amine to acid ratio, and reactant concentration. Thus, at a concentration of amine and ether reactants of two molar each and temperatures in the order of 35 to 50° C., employing an amine to acid mole ratio of say, 10:1 to 20:1, the preferred reaction period is from about ½ to 4 hours. Similarly, employing the same reactants and amine to acid mole ratio, at a reactant concentration of 0.8 molar each and at a temperature of 25° C., the reaction time may extend to 20 to 24 hours or longer. In contrast, at a temperature of 160° C. a time in the order of 1 minute is often utilized, and even under those conditions rather low product yields may be obtained due to undesirable side reactions.

Pressure does not materially affect the amination reaction, any pressure being sufficient that retains the reactants in liquid phase.

Although the amination will proceed without the addition of an acid as a catalyst, the reaction rate under such conditions is extremely slow. It is, accordingly, required that an acid catalyst be utilized at all times in order that product be formed in significant yield. Any acid can be utilized as a catalyst in the practice of the invention. However, in a particular instance, it is advantageous to select an acid catalyst the amine salts of which are soluble, at least to a moderate degree, in the other components of the reaction mixture. In most systems, the selection of the preferred catalyst will also depend on the particular ether and amine reactants employed. Thus, by way of illustration, when aniline is employed as the amination agent, HCl and toluene sulfonic acid, which form soluble salts with the aniline, are advantageously employed; and, further, when employing monomethylamine as the amination reactant, sulfuric acid is a suitable catalyst. Exemplary acids that can be employed as catalyst in carrying out the amination are sulfuric, hydrochloric, phosphoric, periodic, perchloric, nitric, benzenesulfonic, methanesulfonic, orthophosphoric, pyrophosphoric, mono-, di-, and tri-, chloracetic and maleic acids; cuprous chloride, zinc chloride, boron trifluoride, ferric chloride, acid clays, e.g., silica-alumina, super filtrol, and acid ion exchange resins such as a polymerized sulfonated vinyl benzene, and the like. Solid acid catalysts are particularly advantageously employed in the practice of the invention as beds, e.g. columnar or layered, in fixed catalyst bed type operation. High oxygen acids such as nitric acid, perchloric acid and periodic acid are less desirable among the inorganic acid catalysts due to the oxidizing tendencies that these acids exhibit during the amination with accompanying decrease in amination product yield. Similarly, inorganic halides are among the less desirable catalysts due to a tendency in some instances to lead to undesirable side reactions and accompanying lowered yield.

The amination is generally carried out in the presence of a solvent although in some instances the use of a solvent can be dispensed with as, for example, when utilizing aniline which can function as both reactant and solvent. A preferred solvent is the alcohol which corresponds to the ether reactant inasmuch as the solvent alcohol and the alcohol produced as by-product of the amination are one and the same and there is, accordingly, no problem involved in the separation of the solvent from the alcohol by-product, for recycle to the system. However, if desired, any suitable solvent can be employed other than the above described preferred solvent. Toluene and toluene-methanol mixtures are advantageously employed as solvent. Glacial acetic acid is another solvent advantageously employed, particularly inasmuch as in that case it is unnecessary to add a separate acid catalyst, i.e., the acetic acid functions as catalyst and solvent. Other weak acids can be employed similarly. The choice of solvent is, of course, dependent upon the solubility of the various constituents of the amination reaction mixture so that in any amination a choice of solvent, if other than the preferred alcohol, can be based upon the reactants employed. When a solvent is employed, the total reactants, including product, are present in the reaction mixture in a concentration in the order of about 1 to 6 molar. However, any proportion of solvent can be employed which retains the reactants in solution. Illustrative of solvents other than alcohols that can be employed are hydrocarbons, e.g., toluene, benzene, xylene, n-hexane and n-heptane; chlorinated hydrocarbons, e.g., chloroform, carbon tetrachloride, ethylene chloride, trichloroethylene, 1,1,1-trichloroethane, chlorobenzene, and 1,2,4-trichlorobenzene; ethers, e.g., diethylether, diethyleneglycol dimethylether, and esters, e.g., ethyl acetate, n-butyl acetate, dimethyl formamide, tributylphosphate, and ethylene glycol.

In carrying out the amination the ether and amine can be charged to the system in any suitable proportions. Thus although the mole ratio of ether to aniline charged is advantageously 1:1, it can be varied to obtain more complete conversion of one or the other of those reactants. Generally however, an amine to ether mole ratio in the range of 0.5:1 to 2:1 is utilized. However, the amine to acid mole ratio is generally greater than 1:1 and preferably in the range of about 2:1 to 40:1, and higher. The amine to acid mole ratio selected may vary with the nature of the amine reactant. For example, when reacting methyl amine, a suitable mole ratio of amine to acid is in the order of about 1.5:1 to 6:1, often about 2:1 and when reacting aniline, a mole ratio of aniline to acid in the order of about 5:1 to 20:1, often about 10:1, is generally employed.

When employing a suitably high amine to acid mole ratio, for example, an aniline to acid ratio of 10:1 or higher, the amination rate appears to be roughly proportional to the product of the reactant concentrations. Thus, when employing such amine to acid ratios, a molar excess of amine over ether reactant increases the rate of reaction with concomitant decrease in the time required for the amination.

The invention is illustrated with reference to the following examples.

EXAMPLE 1

50.2 grams (0.33 mole) of p-nitrosophenyl ethyl ether was dissolved in 175 ml. of absolute ethanol in a one-liter reaction flask and maintained under a blanket of nitrogen. A slurry of 30.9 grams (0.33 mole) of aniline and 1.51 grams (0.015 mole) of concentrated sulfuric acid in 140 ml. of absolute ethanol was added to the alcohol ether solution. The resulting ether and aniline-containing admixture was maintained in the nitrogen atmosphere with stirring at about 25° C. for 16.5 hours and was thereafter neutralized with 22 ml. of 10 percent by weight alcoholic KOH. Precipitated p-nitrosodiphenylamine product was then separated from the reaction mixture by filtration, washed with three 50-ml. portions of n-pentane and air dried. The filtrate and washings were combined and filtered to remove $K_2SO_4$ and then evaporated over steam. The residue was dissolved in 50 ml. of methanol and crystallized at about −30° C. to yield crystals of p-nitrosodiphenylamine which were then separated by filtration.

The combined crude product (56.3 grams, 81.5 percent conversion based on the ether reactant) was recrystallized from methanol to yield 42.0 grams of purified p-nitrosodiphenylamine having a melting point of 144–145° C., the infrared spectrum of which was the same as that of a known sample of p-nitrosodiphenylamine. The results of a carbon-hydrogen-oxygen analysis of the product are as follows:

| Weight Percent | Calculated for $C_{12}H_{10}N_2O$ | Found |
| --- | --- | --- |
| Carbon | 72.71 | 72.36, 72.56 |
| Hydrogen | 5.09 | 5.19, 5.24 |
| Oxygen | 8.08 | 8.35 |

EXAMPLE 2

The reaction procedure of Example 1 was repeated and the reaction mixture was analyzed by ultraviolet spectroscopy. A reaction conversion to p-nitrosodiphenylamine, of 93 percent, was obtained after 20.5 hours at room temperature.

EXAMPLE 3

Ten ml. of 4.0 M p-nitrosophenyl methyl ether (0.040 mole) solution in a methanol (40 volume percent)-toluene (60 volume percent) mixture was added to 10 ml. of a 4.0 M aniline (0.040 mole)-0.2 M p-toluenesulfonic acid monohydrate (0.002 mole) solution in absolute methanol contained in a 125 ml. centrifuge tube. The centrifuge tube was capped, flushed with nitrogen and placed in a bath at 50° C., the reaction mixture being stirred magnetically. After 90 minutes at 50° C., the reaction mixture was chilled in an ice bath and centrifuged to separate crystalline product. The mother liquor was decanted and the dark blue solid washed with 20 ml. portions of n-pentane. The washed crystals were dried at 60° C. under reduced pressure for 6.5 hours. The process conversion to p-nitrosodiphenylamine (90 percent purity) was 81 percent (7.1 grams), based on the ether reactant.

EXAMPLE 4

The procedure of Example 3 was repeated except on a smaller scale and the products analyzed by ultraviolet spectroscopy, the conversion to p-nitrosodiphenylamine being 95 percent following reaction for 90 minutes at 50° C.

EXAMPLE 5

A reaction mixture, 160 ml. in volume, from the preparation of p-nitrosophenyl butyl ether by reaction of p-nitrosophenol with n-butanol in the presence of p-toluenesulfonic acid as a catalyst, in accordance with the process disclosed and claimed in the above said application Serial No. 17,895, had the following composition as determined by ultraviolet spectroscopy: 0.436 mole p-nitrosophenyl butyl ether, 0.0582 mole unreacted p-nitrosophenol, and the remainder, n-butanol.

The above reaction mixture was maintained under a blanket of nitrogen and in a water bath, at a temperature of about 45° C. A solution (63 ml.) of 42.6 grams (0.457 mole) of aniline and 3.04 grams (0.16 mole) p-toluenesulfonic acid monohydrate in n-butanol was added to the nitrogen covered reactants and the resulting reaction mixture stirred at the above said temperature for 2.5 hours after which the temperature was lowered to 20°, with continued stirring for 0.5 hour and precipitated product, (p-nitrosodiphenylamine) separated by filtration. The product, a dark blue-black solid, was collected on the filter, washed with three 100 ml. portions of water and dried over $P_2O_5$ at room temperature under reduced pressure. The product crystals were of 88 percent purity and were produced at a conversion level of 90 percent.

EXAMPLE 6

A reaction mixture of 7 ml. n-butanol, 41.1 grams p-nitrosophenyl butyl ether, 25 ml. aniline and 3.3 grams aniline hydrochloride, the mole ratio of p-nitrosophenyl butyl ether/aniline/HCl being 1/1.30/0.11, was stirred for 2 hours at 35° C., after which time 25 ml. of n-hexane and 100 ml. water was added. The resulting slurry cooled to 10° C. and was filtered and the cake washed with 100 ml. n-hexane. Analysis of the total precipitated product and filtrate by ultraviolet spectroscopy showed a conversion to p-nitrosodiphenyl amine of 91% based on the ether reactant.

The following amine-ether reactions were conducted in a closed system to provide a corresponding p-nitroso-N-substituted aniline product. These reactions were conducted in either ethanol or methanol as a solvent at temperatures within the range of 25–40° C., at an amine to ether mole ratio of from 1:1 to 2.6:1 and at an amine to acid mole ratio of from 2:1–20:1. The ether reactant in all cases was p-nitrosophenetole to form the corresponding p-nitroso-N-substituted aniline. Conversions, based on the ether reactant, were at various levels up to 92%.

Table I

| Example No. | Amine Reactant | Acid Catalyst | Product |
|---|---|---|---|
| 7 | Methyl amine | $H_2SO_4$ | p-Nitroso-N-methylaniline. |
| 8 | n-Butyl amine | p-Toluenesulfonic acid. | p-Nitroso-N-butylaniline. |
| 9 | Cyclohexyl amine | HCl | p-Nitroso-N-cyclohexylaniline. |
| 10 | Benzyl amine | HCl | p-Nitroso-N-benzylaniline. |
| 11 | Ethanol amine | HCl | p-Nitroso-N-(β-hydroxyethyl)aniline. |
| 12 | Octadecyl amine | HCl | p-Nitroso-N-octadecylaniline. |
| 13 | o-Toluidine | HCl | o-Methyl-p'-nitrosodiphenylamine. |
| 14 | m-Toluidine | HCl | m-Methyl-p'-nitrosodiphenylamine. |
| 15 | p-Toluidine | HCl | p-Methyl-p'-nitrosodiphenylamine. |
| 16 | p-Anisidine | $H_2SO_4$ | p-Methoxy-p'-nitrosodiphenylamine. |
| 17 | p-Phenetidine | HCl | p-Ethoxy-p'-nitrosodiphenylamine. |
| 18 | p-Chloroaniline | $H_2SO_4$ | p-Chloro-p'-nitrosodiphenylamine. |
| 19 | p-Phenylenediamine | HCl | p-Amino-p'-nitrosodiphenylamine. |
| 20 | p-Cyanoaniline | $H_2SO_4$ | p-Cyano-p'-nitrosodiphenylamine. |
| 21 | p-Nitroaniline | HCl | p-Nitro-p'-nitrosodiphenylamine. |
| 22 | p-Amino benzoic acid | HCl | p-Carboxyl-p'-nitrosodiphenylamine. |
| 23 | o-Phenylenediamine | HCl | o-Amino-p'-nitrosodiphenylamine. |
| 24 | m-Aminophenol | HCl | m-Hydroxy-p'-nitrosodiphenylamine. |
| 25 | p-Phenylene diamine | HCl | N,N'-bis(p-nitrosophenyl)-p-phenylenediamine. |
| 26 | p,p'-Diaminodiphenylmethane | $H_2SO_4$ | N,N'-bis (p-nitrosophenyl)-p,p'-diaminodiphenyl-methane. |
| 27 | Benzidine | HCl | N,N'-bis(p-nitrosophenyl)benzidine. |

A series of etherification reactions was carried out in each of which an alcohol was reacted with p-nitrophenol at 25° C. in the presence of p-toluenesulfonic acid as a catalyst to form a corresponding p-nitrosophenyl ether, in accordance with the process of copending application Serial No. 17,895 above referred to. Aniline was admixed with the resulting etherification reaction mixture in each instance and reacted with the ether product therein at about 25° C. to produce p-nitrosodiphenylamine, there being sufficient p-toluenesulfonic acid catalyst in the resulting etherification reaction mixture to catalyze the aniline-ether reaction. The conversions to p-nitrosodiphenylamine, based on the ether reactant, were at various levels up to over 90 percent. The amine/ether and amine/acid mole ratios were about the same as those of Table I.

The alcohols separately reacted with p-nitrophenol in the presence of the acid catalyst to form the corresponding ether, are as follows, aniline then being added to the resulting etherification reaction mixture to form p-nitrosophenylamine as above described.

Table II

| Example No. | Alcohol | Ether-Product |
|---|---|---|
| 28 | 2-Octyl alcohol | p-Nitrosophenyl 2-octyl ether. |
| 29 | Cyclohexyl alcohol | p-Nitrosophenyl cyclohexyl ether. |
| 30 | 2-Ethoxyethyl alcohol | p-Nitrosophenyl ethoxyethyl ether. |
| 31 | Oleyl alcohol | p-Nitrosophenyl oleyl ether. |
| 32 | Benzyl alcohol | p-Nitrosophenyl benzyl ether. |
| 33 | Allyl alcohol | p-Nitrosophenyl allyl ether. |
| 34 | Furfuryl alcohol | p-Nitrosophenyl furfurly ether. |
| 35 | Cetyl alcohol | p-Nitrosophenyl cetyl ether. |

Any primary or secondary alcohol can be utilized as the alcohol reactant in the practice of the process of the said copending application Serial No. 17,895. However, those more generally utilized, and preferred, contain not more than about 30 carbon atoms. Exemplary of alcohol reactants utilized in the practice of that process are n-propyl alcohol, i-butyl alcohol, n-decyl alcohol, lauryl alcohol, tridecyl alcohol, stearyl alcohol, n-octacosanol, ceryl alcohol, cinnamic alcohol, tetrahydrofurfuryl alcohol, furfuryl alcohol, ethylene glycol, glycerol, pentaerythritol, p-octylbenzyl alcohol, p-methylbenzyl alcohol, p-chlorobenzyl alcohol, propargyl alcohol, isopropylpropargyl alcohol, 2-phenyl ethanol, p-hexoxybenzyl alcohol, p-methoxybenzyl alcohol, p-nitrobenzyl alcohol and hexamethyleneglycol. Further exemplary are those alcohol reactants tabulated hereinabove. Alcohol reactants presently preferred in the practice of the process of the said copending application are those characterized by the structural formula

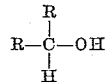

wherein each R is a radical selected from the group consisting of hydrogen, alkyl, alkenyl, alkinyl, phenyl, alkylphenyl, phenylalkyl, alkoxyphenyl, phenylalkenyl, alkoxy alkyl, hydroxy alkyl, cycloaliphatic, halophenl, nitrophenyl, furan and tetrahydrofuran, but the said alcohol containing not more than 30 carbon atoms.

EXAMPLE 36

15.7 ml. of 0.86 molar methylamine in ethanol and 6 ml. of 0.5 molar $H_2SO_4$ in ethanol were admixed with 0.75 gram of p-nitrosophenetole and the resulting admixture stirred at 25° C. for 23 hours. A sample of the resulting reaction mixture was analyzed by ultraviolet visible spectroscopy and a conversion of the ether to p-nitrosophenyl-N-methylaniline, of 41 percent, was observed.

Figure 2C:
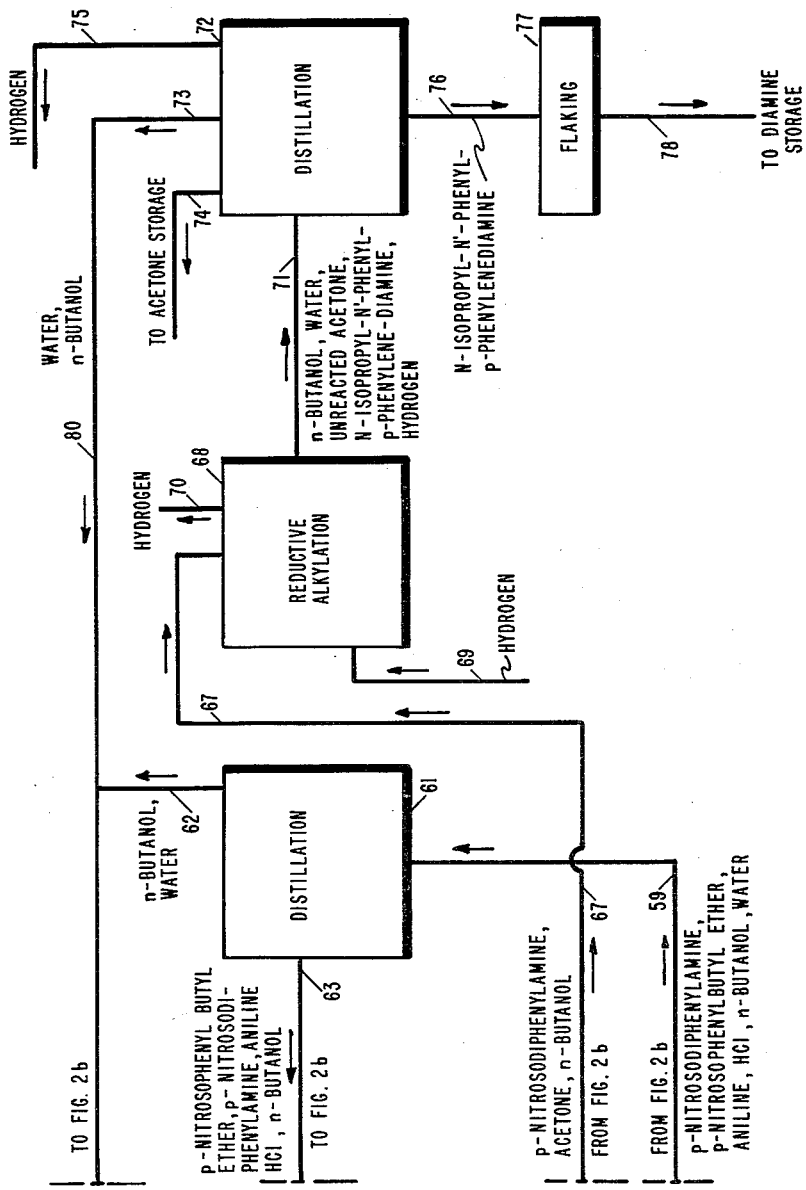
Figure 4A:
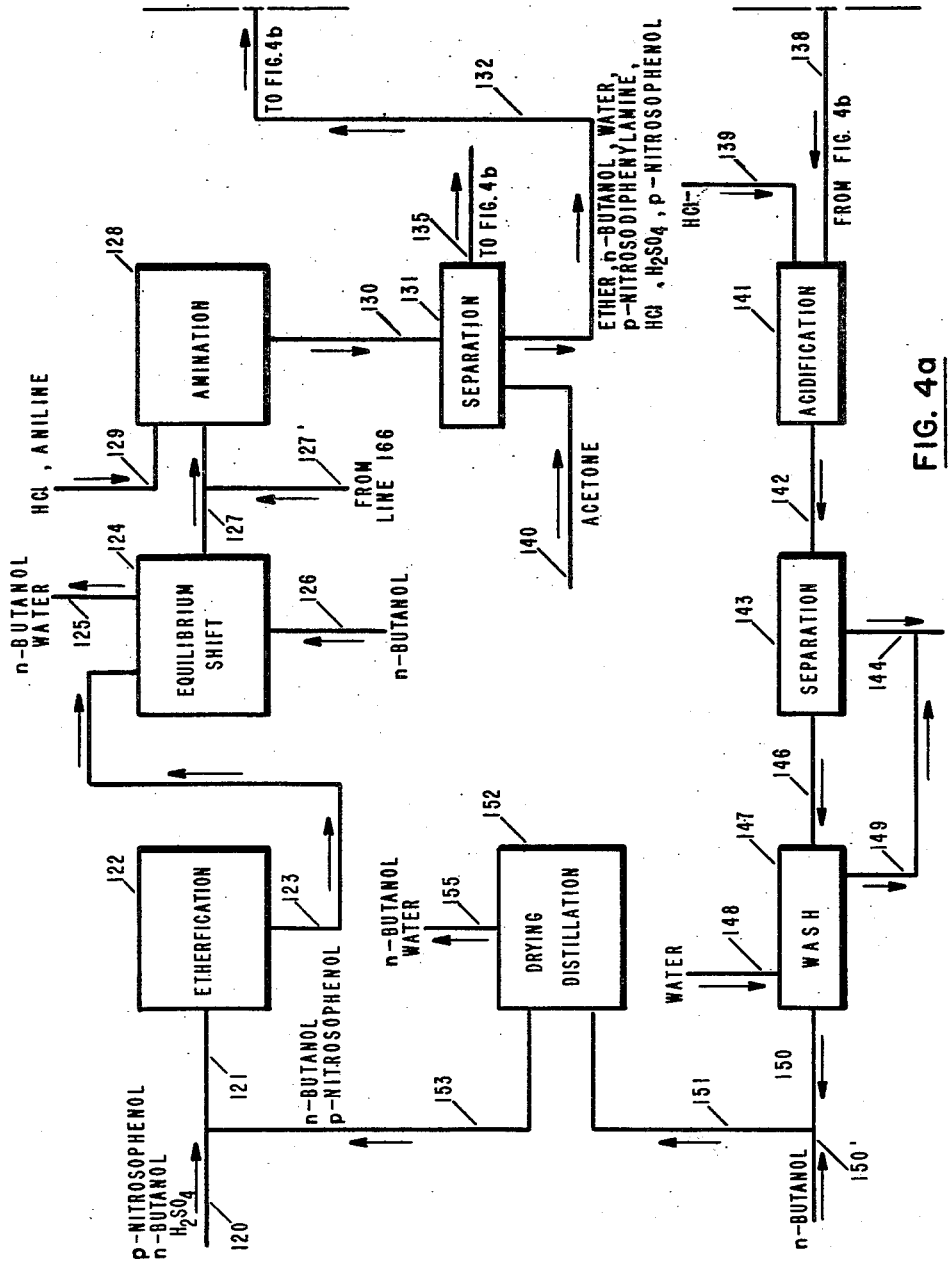
Figure 5:
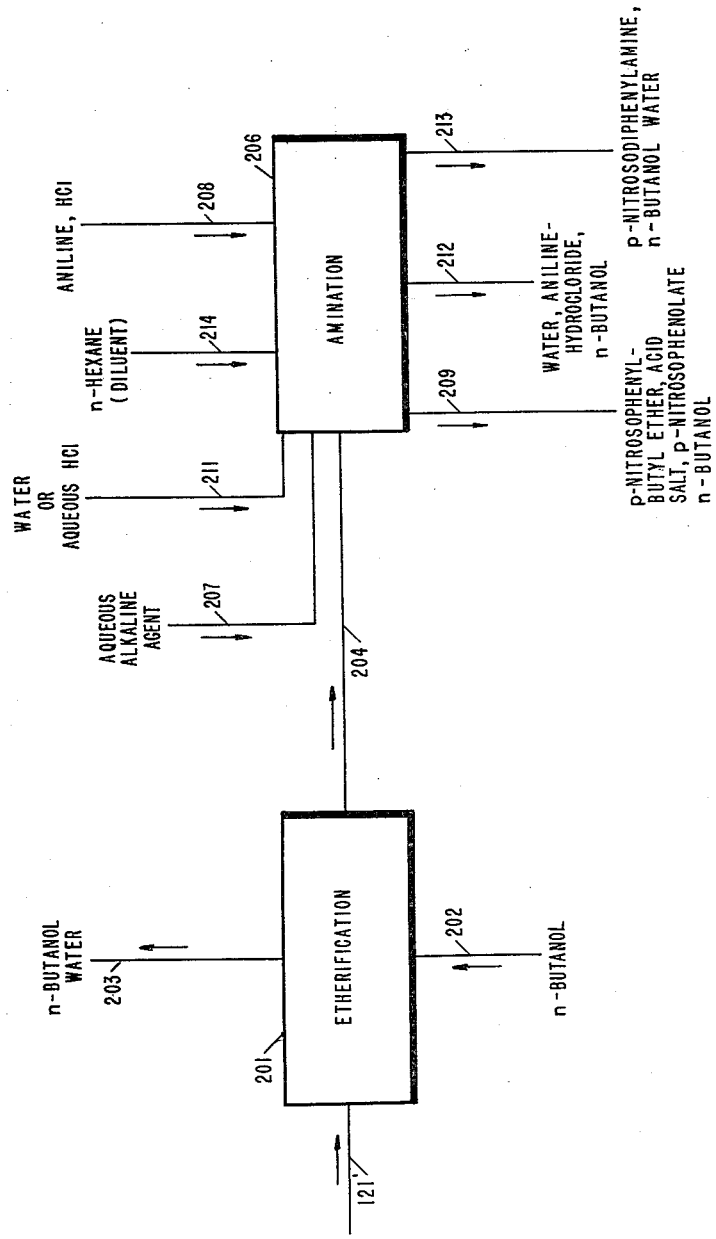

The process of the invention is further illustrated with reference to the schematic flow diagrams of the attached drawings of which FIGURE 1 is illustrative of the basic amination process concept; FIGURES 2a, 2b, and 2c are illustrative of a process for manufacture of p-nitroso-N-substituted anilines utilizing the ether route for effecting, indirectly, the amination of p-nitrosophenol; FIGURE 3 is illustrative of batch type process utilizing the ether route of FIGURE 2; FIGURES 4a–b are illustrative of another embodiment of process for the manufacture of p-nitroso-N-substituted anilines utilizing the ether route but differing from that of FIGURES 2a–c in respect to steps involving the recovery of unreacted p-nitrosophenol and amine reactants for return to the system; FIGURE 4c is illustrative of a sequence of steps following amination alternative to that of FIGURES 4a–b; and FIGURE 5 is illustrative of an embodiment of batch type operation of the overall process of FIGURES 4a–c.

Referring to FIGURE 1, a p-nitrosophenyl ether and an alcohol, for example an alkanol, advantageously as a mixture via line 1, is introduced into amination zone 2 together with amine reactant and acid catalyst for the amination via line 3. The mole ratio of the ether to the amine charged to zone 2 is preferably in the order of about 1:1, and the reaction mixture contains acid in an amine/acid mole ratio in the order of about 2:1 to 40:1 as described hereinabove. Alcohol introduced via line 1 functions as a solvent for the amination and preferably corresponds to the ether charged therewith, as discussed hereinabove. The volume of alcohol solvent in the amination zone 2 is to a large extent a matter of choice so long as the reactants are retained in solution, the quantity of alcohol constituting generally in the range of from about 25 to 50 volume percent of the amination reaction mixture.

Amination zone 2 is maintained at a temperature generally within the range described hereinabove and more often within the limits of about 15 to 100° C. The residence time in zone 2, generally within the above described range of reaction time, is more often within the limits of about ½ to 3 hours. p-Nitroso-N-substituted aniline product, being of low solubility in the alcohol solvent, precipitates in the reaction mixture and is discharged, slurried with the remaining reaction mixture components, as total effluent via line 4 to separation zone 5 which comprises various means for resolution of the effluent from line 4 into separate product and component streams. Zone 5 contains, therefore, any suitable combination of elements such as centrifugal separation means, means for neutralization, filtration means, rectification means, crystallization means, driers and the like for resolution of the said effluent. Accordingly, p-nitroso-N-substituted aniline can be discharged from zone 5 as a slurry in alcohol solvent or in dry crystal form via line 6. Alcohol and unreacted ether generally as a mixture is discharged from zone 5 via line 6a for recycle if desired to zone 2 via line 1, unreacted amine reactant is discharged via line 6b also for recycle if desired to zone 2 via line 3, and catalyst salt product of neutralization, is discharged via line 6c.

Product from line 6, in slurry form or dry crystals as desired, although it can be passed to storage, is advantageously passed directly to any suitable further utilization alone or in admixture with other solvents or reactants introduced into line 6, not shown. The most common utilization of product from line 6 is its function as an intermediate in the manufacture of its diamine derivatives, which generally involves, as at least an initial step, the reduction of the nitroso group to the amine. Various other utilizations of the product from line 6 are well known in the art.

With reference to FIGURE 2a, phenol is nitrosated in nitrosation zone 12 by reaction with nitrous acid formed by in situ reaction, in zone 12, of suitable nitrite and acid reactants well known in the art. Generally, an alkali metal nitrite, preferably sodium nitrate, is reacted with an inorganic mineral acid, preferably sulfuric acid, for that purpose. Thus, in accordance with one procedure, applicable to all such reactants but illustrated with reference to the now preferred sodium nitrite and sulfuric acid reactants, separate streams comprising water, molten phenol, aqueous sodium nitrite, aqueous sodium hydroxide and aqueous sulfuric acid are introduced into zone 12 via lines 7, 8, 9, 10 and 11, respectively preferably in relative proportions to provide nitrous acid in about a 10 percent stoichiometric excess of phenol reactant. Exemplary to total charge to zone 12, including acid salt recycled via line 18, is, on a weight basis, water, 87 percent; phenol, 5 percent; sodium hydroxide, 0.6 percent; sodium nitrite, 4 percent; acid salt, 0.4 percent and sulfuric acid, 3 percent. The optimum proportions are largely dictated by the choice of reactants employed in zone 12.

In carrying out the nitrosation in zone 12, the negative heat of solution of sodium nitrite in water can be advantageously utilized by forming aqueous nitrite solution in line 9 just prior to introduction of same into the nitrosation zone, the newly formed aqueous nitrite solution thereby functioning as a coolant to aid in bringing the reaction zone 12 to the desired level which is generally in the order of about 20 to 30° C. p-Nitrosophenol product formed in zone 12 precipitates from the reaction mixture.

Total effluent, a slurry, is discharged via line 13 to separation zone 14 which comprises suitable means for separating the solid p-nitrosophenol for etherification described hereinafter. Zone 14, for example, can be a centrifugal separation system or if desired, it can constitute a filtration system comprising two separate filtration units for continuous filtration in one unit with concurrent removal of previously collected precipitated p-nitrosophenol from the other unit. In either event water-wet p-nitrosophenol is separated and discharged from zone 14 via line 15 for further drying in drying zone 31. An alcohol reactant for the etherification described hereinafter with reference to zone 34, preferably at least partially water immiscible such as n-butanol and illustrated by specific reference to n-butanol is added to the system via lines 19, 19' and 21 to serve not only as a reactant-solvent during the hereinafter described etherification, but to be available for distillation in zone 31 as a component of a n-butanol-water distillate for drying p-nitrosophenol in zone 31. When n-butanol is added to the system via line 19', it also functions as a carrier for the wet p-nitrosophenol from zone 14.

If desired, n-butanol can be added to line 21 via lines 19, 20, separation zone 14 and line 15, in that manner assisting in the removal of solid p-nitrosophenol from the separation means utilized. In any event the charge to zone 31 generally contains from about 60 to 90 weight percent n-butanol, 10–30 weight percent p-nitrosophenol and the remainder water. Residual liquid, i.e., freed from solid p-nitrosophenol, is discharged from zone 14 via lines 16 and 17 for utilization external to the process or recycle in part to zone 12 via line 18 and comprises water, acid salt and some dissolved nitrosophenol. Generally, it is more advantageous to pass the stream in line 16 to utilization external to the process.

A slurry of n-butanol, water and p-nitrosophenol from line 21 is subjected to distillation in zone 31 under vacuum to remove water from the slurry to an extent, if not entirely, as a component of a n-butanol-water distillate. The distillation in zone 31, which is advantageously carried out under vacuum to facilitate removal of the water, provides bottoms product containing less than about 0.2 weight percent water. Thus, zone 31 is advantageously operated at a pressure in the range of from about 20 to 50 mm./Hg and at a temperautre in the order of 25 to 60° C. However, when desired, temperature and pressure conditions outside these ranges can be utilized.

Dry, i.e., substantially water-free, slurry is discharged from zone 31 via line 33 to etherification zone 34 together with an acid from line 36 as, for example, sulfuric acid, the acid being advantageously dissolved in dry n-butanol as a carrier, the n-butanol also serving as make-up for n-butanol lost from zone 31 via line 32. Although the acid need not be added with the dry n-butanol carrier, it is important that in any event it be added in dry state inasmuch as the presence of water is to be minimized in zone 34 due to its reverse effect on the etherification equilibrium reaction.

p-Nitrosophenol in zone 34 is etherified with n-butanol to form the corresponding ether, i.e., a p-nitrosophenyl butyl ether. The mole ratio of alcohol to p-nitrosophenol introduced into zone 34 is in the range of about 1:1 to 100:1, and the mole ratio of acid to p-nitrosophenol introduced into zone 34 is in the range of about 0.005:1 to 0.2:1. The proportions of reactants, on a weight basis, introduced into zone 34 are generally in the order of from 10 to 30 percent p-nitrosophenol, 70 to 90 percent n-butanol and from 0.20 to 2 percent acid, the n-butanol so added serving as both reactant and solvent. Zone 34 is maintained generally at a temperature within the range of 0 to 150° C., and more often within the range of about 15 to 70° C., and at any suitable pressure sufficient to maintain the reactants in liquid phase. However, inasmuch as distillation in zone 31 is preferably conducted under subatmospheric pressure and inasmuch as distillation in zone 38, FIGURE 2b, described hereinafter, is also advantageously conducted under subatmospheric pressure, it is most advantageous that zone 34 be also conducted under subatmospheric pressure, say from about 20 to 50 mm. Hg, from the standpoint of problems involved in flowing materials through these three zones, particularly inasmuch as the pressure level employed in zone 34, assuming liquid phase reaction, has no measurable effect upon the conversion obtained therein.

Reaction time in zone 34, under the preferred temperature conditions, is generally within the range of from 2 to 500 minutes although reaction times outside that range can be utilized particularly if correlated inversely with etherification temperatures in zone 34 outside the above described temperature range.

Maximum conversion in zone 34 is generally in the order of 50–55 percent and is determined by the equilibrium of the etherification reaction, which is as follows:

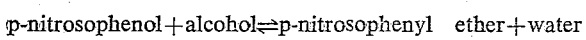

p-nitrosophenol+alcohol⇌p-nitrosophenyl ether+water

The above equilibrium equation makes it clear that by removal of the water of etherification, the reaction can be caused to proceed more completely toward the ether product formation. Thus, total effluent from etherification zone 34 is discharged via line 37, as liquid phase, into the top of water removal zone 38, see FIGURE 2b, and flowed downwardly therethrough. Dry n-butanol is introduced into a lower portion of zone 38 via line 35 and is passed as a vapor through the downwardly flowing liquid body in zone 38 under subatmospheric pressure of, say about 20 to 50 mm. Hg at a temperature in the order of about 20 to 50° C. being advantageously employed. Under these conditions, n-butanol as vapor, rises in contact with the liquid body in zone 38, and condenses with repeated revaporization and recondensation, the water content in the vapor increasing with each so as to provide n-butanol vapor of high water content, say approaching, but generally less than, the water content of the n-butanol-water azeotrope which is about 38 percent water. Zone 38, therefore, functions as a sparge-vacuum distillation to remove water of etherification from the etherification reaction mixture. n-Butanol sparged through the liquid body, as described, emerges from zone 38 with water as a vaporous mixture, via line 39. During the sparge-vacuum distillation in zone 38, the water of etherification being substantially completely removed, the equilibrium of the etherification is shifted toward the ether side so as to raise the once-through conversion of zone 34 to a value markedly higher than the 50–55 percent value described hereinabove. Thus, under the sparging conditions in zone 38, conversions up to as high as 90–95 percent, and higher, are obtained. n-Butanol as the etherification reactant-solvent is particularly advantageously applied in its utilization in zone 38 inasmuch as resulting vapor in zone 38 is water rich and accordingly, a significant proportion of water (e.g., 20–30 percent) is removed via line 39 per volume of n-butanol removed with it. Thus, n-butanol can be distilled in relatively small quantity to remove substantially all water of etherification in the equilibrium shift step.

Water-free bottom product is discharged from zone 38 via line 41 and comprises ether product, unreacted p-nitrosophenol, n-butanol and acid catalyst and is passed to neutralization zone 42 together with an aqueous neutralization agent from line 43, generally an aqueous alkali metal hydroxide as sodium hydroxide. Neutralization zone 42 is maintained at any suitable temperature for effecting neutralization of the acid from line 41 and conversion of p-nitrosophenol therein to the corresponding phenolate for separation described hereinafter. Thus, zone 42 can be advantageously operated at temperatures in the order of 20 to 35° C.

Two phases separate in neutralization zone 42, namely, an organic and an aqueous phase, the relative densities depending upon the relative concentrations of n-butanol and the ether reactant in the effluent from line 41. Organic phase 46 comprises the ether product dissolved in n-butanol with a small accompanying proportion of water. Aqueous phase 44 comprises the nitrosophenolate above referred to, water, acid salt from neutralization, and n-butanol.

Aqueous phase 44 is discharged via line 48 to acidification zone 51 together with aqueous acid such as sulfuric acid, via line 53, zone 51 being maintained at any suitable temperature for acidification of the phenolate to p-nitrosophenol, say, 20–35° C. Separate organic and aqueous phases are formed in zone 51, namely, an aqueous phase 52 and a lighter organic phase 50, the organic phase 50 comprising a solution of unreacted p-nitrosophenol in n-butanol discharged via line 54 for recycle to the system via drying and distillation zone 31, and aqueous phase 52 containing extracted catalyst salt from the neutralization, water and some n-butanol discharged via line 55. n-Butanol, as an extraction solvent for the p-nitrosophenol, supplemental to n-butanol from line 48 is added to zone 51 via line 64.

Organic phase 46 is discharged from neutralization zone 42 via line 47 to amination zone 49. The stream in line 47 contains generally from about 50 to 65 weight percent p-nitropsophenyl butyl ether, 2 to 5 weight percent water and the remainder n-butanol. Aniline, illustrative of the amine reactant in zone 49, is passed into zone 49 via line 56 together with an acid as a catalyst for the amination such as aqueous HCl. Acid catalyst utilized in the amination reaction in zone 49 can be the same as utilized in the etherification of zone 34. Total charge to zone 49 generally contains p-nitrosophenyl butyl ether in a mole ratio to aniline in the order of about 1:1, and in a mole ratio to acid in the order of about 10:1. However, as is set forth hereinabove, other suitable ether/aniline and aniline/acid ratios can be employed. The amination zone 49 which can be advantageously maintained at a temperature in the range of from about 0 to 160° C., is in this embodiment, i.e., the reaction involving aniline, preferably at about 25 to 50°, the corresponding residence time being generally at least ½ hour and up to about 4 hours. Any suitable pressure can be utilized in zone 49, a pressure in the order of about atmospheric being generally employed.

In the amination of zone 49, the aniline reacts with the p-nitrosophenyl butyl ether component of the stream from line 47 to produce the corresponding p-nitrosodiphenylamine which precipitates due to its low solubility in the resulting reaction mixture. Total effluent from zone 49 comprises precipitated p-nitrosodiphenylamine, unreacted ether and aniline reactants, acid catalyst, water and n-butanol, and the resulting slurry is passed via line 57 to a suitable separation zone 58 for separation of the crystalline p-nitrosodiphenylamine from the residual liquid. Separation zone 58 comprises any suitable means for separating the precipitated product and can be, for example, a centrifugal separation system or a filtration system comprising a pair of filtration units to provide for continuous filtration in one unit with concurrent removal of precipitate, previously collected, from the other unit. In any event, solid p-nitrosodiphenylamine product is removed from zone 58 in any suitable manner for recovery or further utilization. Thus, in a preferred practice of the invention, the precipitated product from zone 58 is dissolved in acetone or other suitable agent for N-alkylating the p-nitrosodiphenylamine product to form the corresponding N-alkyl p-amino diphenylamine derivative, as described hereinafter, by introduction of the alkylating liquid via line 60 into contact with the solid p-nitrosodiphenylamine product in separation zone 58, and discharge of the solution thus formed into line 67.

Residual liquid is discharged from zone 58 via line 59 and comprises a small proportion of p-nitrosodiphenylamine product, unreacted amine and ether reactants, acid, n-butanol and water and is passed directly to distillation zone 61 wherein it is distilled preferably under vacuum to remove water overhead with n-butanol as an overhead distillate via line 62. The bottoms from distillation 61 is recycled via line 63 to the amination in zone 49.

p-Nitrosodiphenylamine solution in line 67 comprises alkylating agent and p-nitrosodiphenylamine with some n-butanol and is passed to zone 68 and is reacted therein, by reduction, to form the corresponding p-amino derivative or by reductive alkylation, a combination of reduction and condensation with a carbonyl compound, to form the corresponding N-alkyl-N'-phenyl-p-phenylenediamine. Thus, zone 68 contains a suitable hydrogenation catalyst alone or together with a suitable condensation catalyst, generally an acid when a ketone is used as the alkylating agent. When carrying out the reduction alkylation, the two types of catalyst (hydrogenation and condensation or alkylation) can be utilized as an admixture. Thus, in one embodiment, a solid granular hydrogenation catalyst such as a supported nickel catalyst can be admixed with an acid alkylation catalyst such as phosphoric acid and contacted in any desired manner with free hydrogen and the charge from line 67 under suitable reductive alkylation conditions of temperature, pressure and time.

Temperature and time conditions employed in zone 68 are, of course, dependent upon the particular catalysts employed. In carrying out the reductive alkylation employing a single catalyst mass, i.e., a mixture of the two catalysts, it is, of course, important that the catalysts be chosen which promote the respective reactions under the same temperature, pressure and time conditions. An exemplary catalyst pair is palladium on charcoal (hydrogenation) and phosphoric acid both of which can be employed in zone 68 at a temperature in the range of from 25 to 70° C. for a period of from 1 to 4 hours at pressures in the range of atmospheric to 1500 p.s.i.g. and higher. Any suitable hydrogenation and condensation or alkylation catalyst can be selected from among those well known in the art. Particularly suitable hydrogenation catalysts are platinum and palladium, each supported on carbon, and supported nickel type catalyst. Illustrative alkylation catalysts are silica-alumina type catalysts and acids such as phosphoric or sulfuric.

In accordance with a now preferred embodiment, a solid granular catalyst mixture is supported in zone 68. p-Nitrosodiphenylamine solution from line 67 is introduced into the top of zone 68 and passed in countercurrent contact therein with upwardly flowing hydrogen from line 69. Residual hydrogen is discharged from zone 68 via line 70. Total liquid product, with some hydrogen, is discharged from zone 68 via line 71 and comprises, in this case, hydrogen, N-isopropyl-N'-phenyl-p-phenylenediamine, acetone, n-butanol and water.

Total effluent from zone 68, in line 71 is introduced into vacuum distillation zone 72 maintained under conditions for discharge of hydrogen overhead via line 75 for recycle, if desired, via line 69, and for distillation of separate n-butanol and acetone overhead distillates via lines 73 and 74 respectively, the residual distillation product being discharged via line 76 to flaking zone 77 followed by recovery of the flaked product via line 78.

As illustrated, n-butanol-water overhead streams in each of lines 73, 62, 55, 39 and 32 are recycled via line 80 to n-butanol rectifier 79 from which water is discharged via line 81 (FIGURE 2a) and n-butanol is discharged via line 82 for recycle to the system via line 19 or if desired, via any one or more of lines 36, 35 and 64.

Referring to FIGURE 3, a slurry the same as that of line 21 of FIGURE 2a is passed to zone 101 which in the order named serves as a zone for drying, etherification, distillation, neutralization and acidification, effluent therefrom being discharged via line 102 to a combined amination and distillation zone 107 described hereinafter.

The slurry of p-nitrosophenol, n-butanol and water in line 21' upon passage into zone 101 is first maintained at a suitable temperature for vacuum drying to remove the water component, the temperature, vacuum distillation and time conditions of zone 31 of FIGURE 2a being advantageously employed. Supplemental dry n-butanol, together with a suitable acid catalyst for the etherification such as sulfuric acid, both from line 103, are introduced into zone 101 for etherification of the p-nitrosophenol as described with reference to etherification in zone 34 of FIGURE 2a, and the etherification carried out. The system in zone 101 is then maintained under vacuum and temperature conditions the same as those of zone 38 of FIGURE 2b to effect removal of water of etherification as a component of a n-butanol-water overhead distillate via line 104, by sparging, utilizing n-butanol from line 100 as sparging agent as illustrated with reference to zone 38 of FIGURE 2b. Suitable neutralization agent, preferably an aqueous alkali metal hydroxide is then added to zone 101 via line 106 to effect neutralization of the acid catalyst and unreacted p-nitrosophenol, the ether-containing reaction mixture corresponding in composition to that of zone 42 of FIGURE 2b whereby the reaction mixture separates into aqueous and organic phases corresponding respectively, to phases 44 and 46 of zone 42. Resulting organic phase, i.e., similar in composition to that of phase 46 of FIGURE 2b, is discharged via line 102 to amination zone 107. Residual aqueous phase in zone 101 is then acidified with additional sulfuric acid introduced via line 108 to convert the sodium nitrosophenolate therein to p-nitrosophenol for discharge via line 109 for reuse with n-butanol in the etherification reaction in zone 101. Residual n-butanol, water and catalyst salt from acidification is passed from zone 101 via line 111 and corresponds in composition to the material in line 55 of FIGURE 2b.

Organic phase from line 102 is passed into zone 107 together with an amine aminating agent therefor, and acid, the amine, water and acid being preferably a mixture, from line 112. The resulting reaction mixture in zone 107 is maintained under aminating conditions of zone 49 of FIGURE 2b. Resulting amination mixture in zone 107 is then subjected to distillation conditions of zone 61 of FIGURE 2c whereby water with butanol is distilled overhead via line 113, and residual product is withdrawn via line 114 to separation zone 116 which can be a filtration or centrifugation and wherein solid p-nitroso-N-substituted aniline product is separated, the residual liquid being recycled in part, if desired, to the amination in zone 107 via line 117 and the remainder, or the entire portion as desired withdrawn via line 119. The solid product is discharged in dry or wet form as desired, via line 118, for storage or further utilization as in the reductive alkylation step of zone 68, FIGURE 2c.

With reference to FIGURES 4a–c, a dry, i.e., substantially water-free, slurry of p-nitrosophenol in n-butanol, and an acid catalyst, are introduced into etherification zone 122, preferably as an admixture via lines 120 and 121 in proportions similar to those introduced into zone 34 of FIGURE 2a, for etherification the same as that described with reference to the said zone 34. Total effluent from zone 122, similar in composition to that of zone 34, FIGURE 2a, contains ether product, i.e., p-nitrosophenyl butyl ether, at a per-pass conversion in the order of from 50–55 percent and is discharged via line 123 to zone 124 wherein it is contacted countercurrently with upwardly flowing vaporous n-butanol under sparging conditions for removal of water of etherification from the said effluent to thereby cause shift of the etherification reaction equilibrium toward the ether side to provide a per-pass conversion in the order of 95 to 99 percent. Conditions utilized in zone 124 are the same as those of zone 38, FIGURE 2b, dry n-butanol being added to zone 124 via line 126 with discharge of n-butanol-water via line 125. Residual effluent, substantially water-free, is discharged from zone 124 via line 127 directly to amination zone 128 together with amine reactant, in this case aniline, and acid catalyst for the amination, often HCl, from line 129, the reactant proportions and conditions in zone 128 being the same as those utilized in carrying out the amination of zone 49, FIGURE 2b. Amination of p-nitrosophenyl butyl ether with aniline as the amination agent takes place in zone 128 to produce the corresponding amine derivative, in this case p-nitrosodiphenylamine. The product, i.e., the p-nitroso-N-substituted aniline, precipitates from the reaction mixture in zone 128, and total effluent therefrom, a slurry, is discharged via line 130 to separation zone 131 which can be any suitable separation means, as described with reference to separation zone 58 of FIGURE 2b. Residual liquid from zone 131 comprises water, unreacted ether reactant, i.e., p-nitrosophenyl butyl ether, unreacted n-butanol, some unprecipitated p-nitroso-N-substituted aniline product, p-nitrosodiphenylamine in this case, some unreacted p-nitrosophenol, HCl and $H_2SO_4$ and is discharged via line 132, together with aqueous alkali metal hydroxide, say NaOH, from line 134, FIGURE 4b to neutralization zone 133, the amount of NaOH from line 134 being sufficient to neutralize not only acid catalyst from line 132, but also to react with the unreacted p-nitrosophenol herein to form the corresponding phenolate. Organic phase 136 and aqueous phase 137 are formed in zone 133.

Aqueous phase 137 comprises water, NaCl, $Na_2SO_4$, sodium p-nitrosophenolate and n-butanol and is discharged from zone 133 via line 138, together with acid from line 139, to acidification zone 141, FIGURE 4a, wherein the sodium p-nitrosophenolate is acidified to form p-nitrosophenol which precipitates in zone 141. A resulting slurry of p-nitrosophenol in water together with remaining components from line 138 is discharged via line 142 to separation zone 143 which comprises any suitable means for separating precipitated p-nitrosophenol from the admixture containing the same from line 142. Thus, zone 143 can comprise a filtration system or centrifugal separation system such as described in more detail hereinabove with reference to separation zone 58 of FIGURE 2b. Residual liquid is discharged from zone 143 via line 144. Wet solid p-nitrosophenol is discharged from zone 143 via line 146 to water wash zone 147 for washing with water from line 148 and discharge of washings via lines 149 and 144. Water wet p-nitrosophenol is discharged from zone 147 via lines 150 and 151 together with supplemental n-butanol from line 150, to drying distillation step 152 maintained under drying distillation conditions the same as those described hereinabove with reference to zone 31 of FIGURE 2a, and with discharge of n-butanol-water distillate via line 155. A dry slurry of p-nitrosophenol in n-butanol is discharged from zone 152 via line 153 and line 121 for recycle to etherification zone 122.

Organic phase 136 in zone 133 comprises some p-nitroso-N-substituted aniline product, i.e., p-nitrosodiphenylamine in this case, n-butanol and unreacted ether and aniline reactants and is discharged via line 154 together with aqueous HCl from line 156 to acidification zone 157 for conversion of the unreacted aniline component to aniline hydrochloride, or in any event, to a water soluble aniline salt. Under these conditions, organic phase 159 and aqueous phase 161 are formed in zone 157 and the soluble aniline salt thus formed is separated from the N-substituted p-nitrosoaniline product by extraction into phase 161. Aqueous phase 161 comprises n-butanol, aniline hydrochloride and water and is discharged from zone 157 via line 162 to solvent stripper zone 163 for distillation of water as a n-butanol-water distillate, discharge of residual liquid, namely, aniline hydrochloride, n-butanol and p-nitrosodiphenylamine via line 166 for recycle to the amination zone via lines 127' and 127.

Organic phase 159 comprises p-nitrosodiphenylamine product, unprecipitated in zone 128, together with some ether in n-butanol, and is discharged from zone 157 via lines 165 and 167 for product recovery or further utilization as desired. Solid p-nitroso-N-substituted aniline product from separation zone 131 of FIGURE 4a is recovered via line 135 in any suitable manner. In a now preferred embodiment, acetone is introduced into zone 131 via line 140 into solution with the solid product, i.e.,  p-nitrosodiphenylamine, and resulting solution discharged via line 135 to line 171, FIGURE 4b together with organic phase discharged from zone 157 via lines 165 and 168 as charge, via line 171, to a reductive alkylation such as that described herein with reference to zone 68 and associated steps of FIGURE 2c. However any suitable solvent or carrier via line 135 can be utilized for removal of solid product from zone 131 for transfer to line 171 with organic phase from line 168 for any desired product recovery and/or utilization steps. If desired, product from zone 131 can be discharged in any suitable form, from line 135 via line 139.

The sequence of the neutralization and acidification steps of zones 133 and 157, respectively, of FIGURE 4b can be reversed if desired. Thus, with reference to FIGURE 4c, zones 157' and 133' are acidification and neutralization zones, similar to zones 157 and 133 respectively of FIGURE 4b. Thus, as shown with reference to FIGURE 4c, residual liquid from separation zone 131 of FIGURE 4a discharged via line 132 to 132' together with water or aqueous HCl from line 156' is passed via line 132'' into zone 157', the conditions of zone 157' being the same as those of zone 157 of FIGURE 4b. Although the proportion of catalyst in the amination of zone 128 of FIGURE 4a is considerably lower than that of the aniline reactant, the proportion of HCl and residual unreacted aniline from line 132 may be about 1:1 or somewhat higher in which event it is necessary only that water be added from line 156' to zone 157'. In any event sufficient HCl is needed from line 156' to assure complete conversion of the unreacted aniline in the residual liquid from line 132, to the water soluble salt, so that aniline, as the hydrochloride, is extracted into aqueous phase 161'. Aqueous phase is discharged from zone 157' via line 162' to a stripping step such as that of zone 163 of FIGURE 4b for removal of water as a n-butanol-water distillate to provide a residual aniline hydrochloride, n-butanol, and p-nitrosodiphenylamine, as bottoms product for return to the amination.

Organic phase 159' in zone 157' comprises n-butanol, ether, some p-nitrosodiphenylamine and unreacted p-nitrosophenol and is discharged via line 154' together with aqueous alkaline agent, generally alkali metal hydroxide from line 134', to zone 133' wherein phases 136' and 137' form and separate. Aqueous phase 137' is the same as phase 137 of zone 133 of FIGURE 4b and is discharged via line 138' for further steps the same as described hereinabove with reference to aqueous phase in line 138 of FIGURE 4b. Organic phase 136' is of the same composition as that of phase 136 of zone 133 of FIGURE 4b except that it is aniline-free and is discharged via line 168' for further processing such as reductive alkylation described hereinabove with reference to organic phase discharged from zone 157 via lines 165 and 168 to reductive alkylation.

Referring to FIGURE 5, a slurry of p-nitrosophenol, n-butanol and sulfuric acid, a composition similar to that in line 121 of FIGURE 4a, is introduced via line 121' into etherification zone 201 and maintained under etherification conditions of temperature, pressure and time described hereinabove with reference to zone 122 of FIGURE 4a for the etherification of the p-nitrosophenol with n-butanol to form the corresponding p-nitrosophenyl butyl ether. During the etherification reaction, dry n-butanol from line 202 is introduced into zone 201 and passed upwardly therein as a vapor through the etherification reaction mixture and is discharged together with water as distillate via line 203 to provide the sparging step for causing shift of equilibrium to the ether side to provide higher ether yield, say, in the order of 95 percent and higher as described hereinabove. Subsequent to the sparge and equilibrium shift operation, total effluent is removed from zone 201 via line 204 directly to amination zone 206. Zone 206 at this point is operated under the amination conditions described hereinbefore with reference to zone 128 of FIGURE 4a for the amine-ether reaction to form the corresponding p-nitroso-N-substituted aniline, the amine reactant, aniline in this case, being introduced into zone 206 together with hydrochloric acid as an amination catalyst, via line 208. Following the amination step, aqueous alkaline agent is introduced into zone 206 via line 207 under which conditions acid in the resulting amination reaction mixture is neutralized and unreacted p-nitrosophenol therein is converted to the corresponding phenolate, the latter being extracted into the resulting aqueous phase discharged from zone 206 via line 209. Following the neutralization, water or aqueous HCl, the latter if required as described hereinabove with reference to zone 157 of FIGURE 4b, is then introduced into amination zone 206 via line 211 under which conditions unreacted aniline as aniline hydrochloride, a water soluble aniline salt, is formed and is extracted into the resulting aqueous phase, discharged via line 212 and comprising water, aniline hydrochloride and n-butanol. A slurry of p-nitrosodiphenylamine, n-butanol and water is then withdrawn from zone 206 via line 213 which can be passed then to product separation and purification means for recovery of p-nitrosodiphenylamine product.

Due to the small proportion of residual organic phase in zone 206 following withdrawal of the aqueous phase via line 212, a suitable inert diluent can be added to zone 206 such as n-hexane via line 214 to facilitate handling of that phase during recovery of product, and in that event is also present in line 213.

In carrying out the above described batch type operation, it is necessary that means be provided in zone 206, such as filter assembly, to collect precipitated p-nitrosodiphenylamine product and prevent its passage into the aqueous phase to be removed.

Alternative to the sequence of neutralization and acidification in zone 206 above described, the said sequence can be reversed consonant with the embodiment illustrated with reference to FIGURE 4c. Thus, following the amination step in zone 206 water or an acid in line 211 is introduced into zone 206 under which conditions unreacted amine reactant is converted to a water soluble salt and extracted into resulting aqueous phase, the latter being then discharged from zone 206 via line 212 for further processing as discussed hereinabove. Organic phase remaining in zone 206 is then neutralized with aqueous alkaline agent from line 207 with formation of separate organic and aqueous phases, the aqueous phase being discharged via line 209 for further processing as above discussed and organic phase being discharged via line 213 for further processing, the stream compositions in each case being the same as those illustrated hereinabove.

The embodiments described hereinabove with reference to FIGURES 4a–c and 5 differ from the overall process embodiment of FIGURES 2a–c particularly in that (1) total effluent from the etherification is passed to the amination without the need for first removing the unreacted p-nitrosophenol and (2) a system of additional neutralization and acidification steps is provided, subsequent to the amination, for recovery and recycle of the unreacted aniline and p-nitrosophenol reactants to the process. The embodiments of FIGURES 4a–c require, however, that the per-pass conversion in the etherification be in the order of 90 percent or higher inasmuch as larger proportions of accompanying unreacted p-nitrosophenol tend to enter into undesirable side reactions during the amination with concomitant lowered amination product yield. The embodiments of FIGURES 4a–c and 5 are, therefore, utilized only when such high per-pass etherification conversions are conducted. As described hereinabove, the sparging step whereby the equilibrium is shifted to the ether side together with suitable sparging conditions for effecting substantially complete water removal is required in the practice of these embodiments.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A process for the preparation of a p-nitroso-N-substituted aniline which comprises reacting a p-nitrosophenyl ether characterized by the structural formula

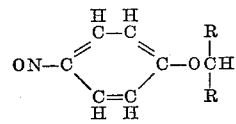

wherein each R is selected from the group consisting of hydrogen, alkyl, alkenyl, alkinyl, phenyl, alkylphenyl, phenylalkyl, alkoxyphenyl, phenylalkenyl, alkoxyalkyl, hydroxyalkyl, cycloaliphatic, halophenyl, nitrophenyl, furan and tetrahydrofuran, but the above said

containing not more than 30 carbon atoms, with a primary amine characterized by the structural formula $RNH_2$ wherein R is a radical selected from the group consisting of alkyl, alkenyl, phenyl, halophenyl, aminophenyl, phenylalkyl, abietylalkyl, cycloaliphatic, hydroxyalkyl, alkylphenyl, alkoxyphenyl, aminoalkyl, cyanophenyl, nitrophenyl, carboxyphenyl, aminotolylphenyl, hydroxyphenyl, aminobiphenyl and phenylaminophenyl, but said amine containing not more than 30 carbon atoms in the molecule, in the presence of an amount of an acid such that the mole ratio of said amine to said acid is greater than 1:1 and does not exceed 40:1, and at a temperature within the range of from 0–160° C., to form the corresponding p-nitroso-N-substituted aniline, and recovering p-nitroso-N-substituted aniline so produced as product of the process.

2. A process of claim 1 wherein said amine is aniline and p-nitrosodiphenylamine is recovered as said product.

3. A process of claim 1 wherein the said amine is introduced into the zone of amine-ether reaction in a mole ratio to said ether within the range of from 0.5:1 to 2:1, said temperature is within the range of from 15–100° C., and wherein the time of reaction is within the range of from one minute to 48 hours.

4. A process of claim 3 wherein said amine is monomethyl amine introduced into the said zone of amine-ether reaction in a mole ratio to said acid within the range of from 1.5:1 to 6:1 and p-nitroso-N-methyl aniline is recovered as said product.

5. A process for the manufacture of a p-nitroso-N-substituted aniline which comprises admixing a p-nitrosophenyl ether characterized by the structural formula

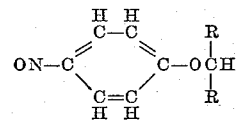

wherein each R is selected from the group consisting of hydrogen, alkyl, alkenyl, alkinyl, phenyl, alkylphenyl, phenylalkyl, alkoxyphenyl, phenylalkenyl, alkoxyalkyl, hydroxyalkyl, cycloaliphatic, halophenyl, nitrophenyl, furan and tetrahydrofuran, but the above said

containing not more than 30 carbon atoms, aniline, and an acid, in a mole ratio of said aniline to said acid in the range of from 5:1 to 20:1 and in a mole ratio of said aniline to said ether within the range of from 0.5:1 to 2:1; maintaining the resulting admixture at a temperature of from 15 to 100° C. to react said ether with said aniline to form p-nitrosodiphenylamine; and recovering p-nitrosodiphenylamine so produced.

6. A process for the manufacture of a p-nitroso-N-substituted aniline which comprises reacting p-nitrosophenol with an alcohol at least partially water-immiscible and selected from the group consisting of primary alcohols and secondary alcohols characterized by the structural formula

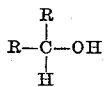

wherein each R is a radical selected from the group consisting of hydrogen, alkyl, alkenyl, alkinyl, phenyl, alkylphenyl, phenylalkyl, alkoxyphenyl, phenylalkenyl, alkoxyalkyl, hydroxyalkyl, cycloaliphatic, halophenyl, nitrophenyl, furan and tetrahydrofuran, but the said alcohol containing not more than 30 carbon atoms, in the presence of an acid, at a temperature in the range of 0–150° C., to produce a corresonding p-nitrosophenyl ether, the resulting ether-containing reaction mixture containing unreacted alcohol reactant; separating said ether product and unreacted alcohol reactant from the resulting etherification reaction mixture as an ether-alcohol solution; admixing the resulting solution with an amine characterized by the structural formula $RNH_2$ wherein R is a radical selected from the group consisting of alkyl, alkenyl, phenyl, halophenyl, aminophenyl, phenylalkyl, abietylalkyl, cycloaliphatic, hydroxyalkyl, alkylphenyl, alkoxyphenyl, aminoalkyl, cyanophenyl, nitrophenyl, carboxyphenyl, aminotolylphenyl, hydroxyphenyl, aminobiphenyl and phenylaminophenyl, but said amine containing not more than 30 carbon atoms in the molecule, and an acid in an amount such that the mole ratio of said amine to said acid is greater than 1:1 and does not exceed 40:1, and maintaining the resulting admixture at a temperature in the range of from 0–160° C. to form a corresponding p-nitroso-N-substituted aniline as amination product; and recovering p-nitroso-N-substituted aniline, so produced, as product of the process.

7. A process for the manufacture of p-nitrosodiphenylamine which comprises reacting p-nitrosophenol with n-butanol, in the presence of an acid and at a temperature within the range of from 15–70° C., to form p-nitrosophenyl n-butyl ether; sparging n-butanol through the resulting ether-forming reaction mixture to remove water of etherification with n-butanol, as a single distillate fraction, from the said reaction mixture concurrently with at least a portion of the etherification reaction to increase the per-pass conversion of p-nitrosophenol to said ether, whereby the residual etherification reaction mixture contains acid catalyst, unreacted n-butanol and p-nitrosophenol reactants, and said ether product; neutralizing said unreacted acid and p-nitrosophenol components by admixing the total residual etherification reaction mixture with an aqueous alkaline agent in an amount sufficient only to neutralize the said components, whereby an organic phase is formed which comprises a solution of p-nitrosophenyl ether product in a portion of said unreacted n-butanol; admixing said organic phase with aniline, and an acid, in an aniline to acid mole ratio of from about 5:1 to 20:1 and maintaining the resulting aniline-containing admixture at a temperature of from 15–100° C., whereby the p-nitrosophenyl butyl ether and aniline components of the said organic phase react to form precipitated p-nitrosodiphenylamine; separating precipitated p-nitrosodiphenylamine from the resulting aniline-ether reaction mixture, and recovering same as product of the process.

8. A process for the manufacture of p-nitrosodiphenylamine which comprises reacting p-nitrophenol with n-butanol, present in excess in the zone of said reacting, in the presence of an acid, and at a temperature within the range of from 0–150° C. to form the corresponding p-nitrosophenyl butyl ether, and removing water of etherification with butanol from the resulting etherification reaction mixture by sparging n-butanol therethrough to shift the etherification reaction equilibrium to the ether side to provide a per-pass conversion of said p-nitrosophenol to said ether of at least 90 percent; admixing total residue etherification reaction mixture directly with aniline and maintaining the resulting admixture at a temperature in the range of from 0–160° C., in the presence of an acid in an amount such that the mole ratio of said aniline to said acid is greater than 1:1 and does not exceed 40:1, whereby the resulting amination reaction mixture comprises p-nitrosodiphenylamine as amination product of said ether and said aniline, together with acid, unreacted n-butanol, ether, p-nitrosophenol and amine reactants; separating p-nitrosodiphenylamine from the resulting amination reaction mixture, and admixing resulting residual liquid with an aqueous alkaline agent to neutralize said acid and convert said p-nitrosophenol to a corresponding phenolate, whereby the resulting neutralization mixture comprises an organic phase comprising unreacted ether, n-butanol and aniline reactants and an aqueous phase comprising acid salt, a p-nitrosophenolate and a portion of said n-butanol; separating said aqueous and organic phases and acidifying said aqueous phase to convert the said p-nitrosophenolate therein to p-nitrosophenol, whereby said p-nitrosophenol precipitates; water washing and drying precipitated p-nitrosophenol and then recycling same to the above said etherification; acidifying said organic phase by action of an aqueous acid to convert said aniline therein to a water-soluble aniline salt, whereby the resulting acidified mixture comprises an aqueous and an organic phase and said water-soluble salt is formed and extracted into the last said aqueous phase; distilling water from the last said aqueous phase whereby resulting bottoms liquid comprises said aniline salt and n-butanol, and recycling said bottoms liquid to the zone of ether-aniline reaction; and recovering said p-nitrosodiphenylamine as product of the process.

9. A process for the manufacture of p-nitrosodiphenylamine which comprises reacting p-nitrosophenol with n-butanol present in excess in the zone of said reacting, in the presence of an acid, and at a temperature within the range of from 0–150° C. to form the corresponding p-nitrosophenyl butyl ether, and removing water of etherification with n-butanol from the resulting etherification reaction mixture by sparging n-butanol therethrough to shift the etherification reaction equilibrium to the ether side to provide a per-pass conversion of said p-nitrosophenol to said ether of at least 90 percent; admixing total residual etherification reaction mixture directly with aniline and maintaining the resulting admixture at a temperature in the range of from 0 to 160° C., in the presence of an acid in an amount such that the mole ratio of said aniline to said acid is greater than 1:1 and does not exceed 40:1, whereby the resulting amination reaction mixture comprises p-nitrosodiphenylamine as amination product of said ether and said amine, together with acid and unreacted n-butanol, ether, p-nitrosophenol and aniline reactants; separating p-nitrosodiphenylamine from the resulting amination reaction mixture, and admixing resulting residual liquid with an aqueous acid to convert the aniline component thereof to a water soluble salt, whereby said acidified mixture comprises an organic phase comprising unreacted n-butanol, p-nitrosophenol and ether reactants, and an aqueous phase comprising a remaining portion of said n-butanol, said amine salt, and water; distilling water from said aqueous phase together with sufficient n-butanol to provide for substantially complete removal of said water therefrom as a water n-butanol distillate fraction, and recycling residual product from said distillation to said amination; admixing said organic phase with a sufficient amount of aqueous alkaline agent to convert said p-nitrosophenol therein to the corresponding phenolate, whereby an organic phase comprising said ether and said n-butanol, and an aqueous phase comprising p-nitrosophenolate and a remaining portion of said n-butanol are formed; acidifying the last said aqueous phase to convert the said phenolate therein to p-nitrosophenol; separating p-nitrosophenol from said aqueous phase, and water washing, drying, and recycling same to said etherification; and recovering p-nitrosodiphenylamine, so produced, as product of the process.

References Cited in the file of this patent

UNITED STATES PATENTS

| | | |
|---|---|---|
| 2,012,801 | Andrussow et al. | Aug. 27, 1935 |
| 2,028,074 | Lauter | Jan. 14, 1936 |
| 2,238,320 | Hardman | Apr. 15, 1941 |
| 2,835,705 | Lamb et al. | May 20, 1958 |

FOREIGN PATENTS

| | | |
|---|---|---|
| 115,305 | Australia | June 9, 1942 |

OTHER REFERENCES

Morawaki et al.: Chemical Abstracts, volume 53, 1959, page 17941.